United States Patent [19]

Schulz et al.

[11] 3,883,547
[45] May 13, 1975

[54] 1,2,3-THIADIAZOLE DERIVATIVES

[75] Inventors: Heinz Schulz; Friedrich Arndt, both of Berlin, Germany

[73] Assignee: Schering AG, Berlin and Bergkamen, Germany

[22] Filed: Feb. 26, 1973

[21] Appl. No.: 335,661

[30] Foreign Application Priority Data
Mar. 23, 1972 Germany.............................. 221463

[52] U.S. Cl............ 260/306.8 D; 71/90; 260/247.1; 260/293.68
[51] Int. Cl............................................ C07d 91/54
[58] Field of Search...... 260/306.8 D, 247.1, 293.68

[56] References Cited
UNITED STATES PATENTS
3,787,434  1/1974  Volpp et al................. 260/306.8 D OTHER PUBLICATIONS
Wagner et al., Synthetic Organic Chemistry, John Wiley & Sons, N.Y., 1953, pp. 645–647.

*Primary Examiner*—Richard J. Gallagher
*Attorney, Agent, or Firm*—Joseph F. Padlon

[57] ABSTRACT

New substituted carbamoyl amino 1,2,3-thiadiazoles as plant regulating agents are provided, including processes for producing these compounds.

10 Claims, No Drawings

1,2,3-THIADIAZOLE DERIVATIVES

The present invention relates to new substituted carbamoylamino-1,2,3-thiadiazoles, plant growth regulating agents containing these compounds as active substance, and processes for the production of these compounds.

Maleic acid hydrazide (1,2-dihydropyridazine-3,6-dione) is known as a growth inhibitor; an active substance which inhibits especially grasses in their growth for a prolonged period of time (cf. German Patent No. 815,192). It has, however, proved disadvantageous in its use since the effect is insufficient in the small quantities used.

It is, therefore, an essential object of the present invention to develop an effective growth regulator for plants even when used in small quantities.

According to the present invention an effective agent is used which is characterized by a content of at least one compound of the general formula

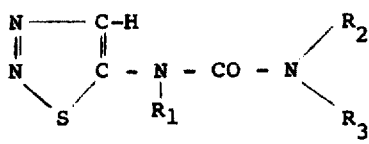

in which
- $R_1$ is hydrogen or low alkyl,
- $R_2$ is hydrogen or alkyl, which may be substituted by oxygen or sulfur atoms,
- $R_3$ is alkyl, substituted once or several times by oxygen or sulfur atoms, a cycloaliphatic hydrocarbon radical, mono- or poly-substituted by alkyl, or an aromatic hydrocarbon radical mono- or poly-substituted by alkyl and/or halogen and/or alkyl mercapto and/or alkoxy and/or trifluomethyl and/or the nitro group, and
- $R_2$ and $R_3$ jointly with the N atom, represent the morpholino, piperidino or pyrrolidino group.

As active substances of the stated general formula above there are provided suitable compounds where the radical $R_1$ is hydrogen, methyl or ethyl; the radical $R_2$ is hydrogen or alkyl containing 1 to 4 carbon atoms, such as methyl or ethyl; the radical $R_3$ is alkyl with 1 to 4 carbon atoms, such as methyl or ethyl, a cycloaliphatic hydrocarbon radical possibly substituted by methyl, such as cyclopentyl, cyclohexyl or methylcyclohexyl, or a phenyl radical possibly mono- or poly-substituted by chlorine and/or methyl and/or methoxy and/or trifluomethyl and/or the nitro group; and the radicals $R_2$ and $R_3$ jointly with the N atom are the morpholino, piperidino, or pyrrolidino group.

The compounds according to the invention are excellently suitable for regulating plant growth by retarding the vegetative growth, such as by shortening the axis-sections, (internodes) thereof. Many advantages are connected therewith, as for example the saving of grass cuts on green areas, the causation of resistance to frost, fog, salination and drought, as well as the prolongation of the harvest period and the improvement of ripeness of the plant.

Moreover, when using these compounds, other advantageous effects can be attained, as for example the increased formation of stem-forming shoots as well as prevention of inflorescences, particularly in grasses, such as the species of avena and cyperus. Possibilities for the use of the compounds of the invention result in fructiculture and viniculture, in the cultivation of ornamentals and vegetables, in agricultural crops, and in landscaping.

The quantities used for the desired regulation of plant growth are, as a rule, 0.3 to 10 kg active substance per hectare.

The manner of the growth-regulating effect, however, depends on the treatment time and, not least, on the type of plant. Against weeds in the early stage or at start of sprouting, the inhibiting effects may occur in a manner which equals, for example, total inhibition of development of a wasteland flora including shrubbery. The chemical compounds of the invention can be used also wherever it is desired not to fully destroy flora at once, but to maintain it in a vegetative low growth stage.

The compounds of the invention may be used either alone or in a mixture with one another or with other active substances. Optionally, other plant protection or pest control agents, such as fungicides, nematocides or other agents may be added, according to the desired purpose. The addition of fertilizers may also be desirable or preferable.

Depending on the purpose of use, other substances may also be added, for example non-phytotoxic components which can produce with herbicides a synergistic increase of action, such as wetting agents, emulsifiers, solvents, oily additions and the like.

Appropriately, the active substances according to the invention or their mixtures are used in the form of suitable preparations, such as powders, scatters, granulates, solutions, emulsions or suspensions, with the addition of liquid and/or solid vehicles or diluents and also wetting, adhesive, emulsifying and/or dispersing agents.

Suitable liquid vehicles are water, aliphatic and aromatic hydrocarbons, such as benzene, toluene, xylene, cyclohexanone, isophorone, and mineral oil fractions.

As solid vehicles there are mineral earths, such as siliceous clay, silica gel, talc, kaolin, attaclay, limestone, silicic acid and plant products, as flours.

Among surface-active substances there may be mentioned calcium-lignin sulfonate, polyoxyethylene-octylphenol ether, naphthalene-sulfonic acids and their salts, phenosulfonic acids and their salts, formaldehyde condensates, fatty alcohol sulfates and substituted benenesulfonic acids and their salts.

The proportion of the active substance or substances in the various preparations may vary within wide limits. The agents contain for example about 20 to 80 percent by weight of active substances, about 80 to 20 percent by weight of liquid or solid vehicles as well as possibly up to 20 percent by weight of surface-active substances.

The application of the agents may be effected in the usual manner, such as with water as vehicle in liquid spray quantities of 100 to 1000 liters/ha. For total weed control, liquid spray quantities of more than 1000 liters/ha may be applied. An application of the agents in the so-called "ultra-low-volume process" is likewise possible, as is their application in the form of so-called microgranulates.

The compounds according to the invention may be produced by known methods such as by the reaction of the respective amino compounds with carbamoyl halides, chloroformic acid esters or isocyanates or with phosgene and subsequent reaction of the isocyanate or carbamoyl halide with a corresponding amine to the desired process products.

The production of these compounds, therefore, occurs for example in that compounds of the general formula

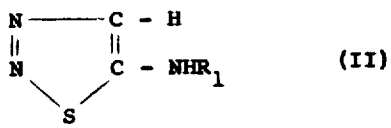

are reacted a. with carbamoyl chlorides of the general formula

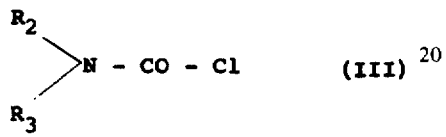

in the presence of an acid acceptor, namely an inorganic or tertiary organic base, such as sodium carbonate or triethylamine, or b. with chloroformic acid esters of the general formula

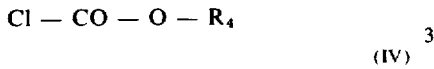

wherein $R_4$ represents a lower alkyl radical, such as methyl or ethyl, in the presence of an acid acceptor, such as triethylamine, and then with amines of the general formula

or c. by first letting phosgene act in the presence of an acid acceptor, such as N,N-dimethylaniline, with formation of the respective isocyanate or carbamoyl chloride and then reacting with an amine of the general formula

or d. if $R_2$ is hydrogen, by allowing isocyanate of the general formula

to act in the presence of a catalyst, appropriately an organic base, such as triethylamine, $R_1$, $R_2$ and $R_3$ having the above meaning and $R_4$ representing a low alkyl radical, such as methyl or ethyl.

The following example illustrates the production of the compounds according to the invention.

5-(N-phenylcarbamoylamino)-1,2,3-thiadiazole 10.1 g (0.1 mole) 5-amino-1,2,3-thiadiazole, 75 ml tetrahydrofurane and 11.5 ml (0.106 mole) phenyl isocyanate are mixed and reacted. In addition 0.1 ml triethylamine is added as a catalyst. After standing overnight, the first crystals will have precipitated. The solvent is removed by evaporation under vacuum, and the residue recrystallized from isopropanol.

M.P.: 217° C (decomposition)

Yield: 16.9 g = 76.7% of the theory

Similarly the following compounds are produced.

| Compounds according to invention | Physical constant |
|---|---|
| 1. 5-(N-4-chlorophenylcarbamoylamino)- 1,2,3-thiadiazole | M.P. 256°C (decomposition) |
| 2. 5-(N-cyclohexylcarbamoylamino)- 1,2,3-thiadiazole | M.P. 215°C (decomposition) |
| 3. 5-(N-3-chlorophenylcarbamoylamino)- 1,2,3-thiadiazole | M.P. 244° C (decomposition) |
| 4. 5-(N-4-methylphenylcarbamoylamino)- 1,2,3-thiadiazole | M.P. 228° C (decomposition) |
| 5. 5-(N-3-methylphenylcarbamoylamino)- 1,2,3-thiadiazole | M.P. 208° C (decomposition) |
| 6. 5-(N-3,4-dichlorophenylcarbamoylamino)1,2,3-thiadiazole | M.P. 236° C (decomposition) |
| 7. 5-(N-methylcarbamoylamino)- 1,2,3-thiadiazole | M.P. 174° C (decomposition) |
| 8. 5-(N,N-dimethylcarbamoylamino)- 1,2,3-thiadiazole | M.P. 222° C (decomposition) |

The products are crystalline substances, which are slightly soluble, for example, in aliphatic and aromatic hydrocarbons and in water, and very soluble in polar organic solvents, such as acetone, cyclohexanone, isophorone, dimethyl sulfoxide and dimethyl formamide, depending on the particular substitution.

The starting products for the production of the compounds of the invention known in the art or can be produced by methods known in the art.

The following examples illustrate the plant growth-regulating effect of the compounds of the invention as well as their possibilities of use.

EXAMPLE 1

In a greenhouse test, potted bush beans (*Phaseolus vulgaris*) were treated with a quantity of 5 kg of active substance per hectare of the compounds of the invention listed in the table below. The active substances were formulated as a 20% spray powder and applied in aqueous suspension at a rate of 500 liters of liquid spray per hectare. The growth regulating effect was determined three weeks after the treatment by measuring the length of the stalk sections (internodes). The measured results were set in relation to those in untreated control plants and calculated as percentual growth retardation.

| Compounds of the invention | Growth retardation in % Bush bean |
|---|---|
| 1. 5-(N-cyclohexylcarbamoylamino)- 1,2,3-thiadiazole | 75 |
| 2. 5-(N-3-chlorophenylcarbamoylamino)- 1,2,3-thiadiazole | 74 |
| 3. 5-(N-4-methylphenylcarbamoylamino)- 1,2,3-thiadiazole | 74 |
|  | 0 |

EXAMPLE 2

In a greenhouse test, potted bush beans (*Phaseolus vulgaris*) and peanut plants (*arachis hypogaea*) were treated in the two-to-three leaf stage with different quantities (0.3, 1 and 3 kg active substance per hectare) of the compound named in the table below according to the invention. The active substance was formulated as a 20% spray powder and applied in aqueous suspension at a rate of 500 liters of liquid spray per hectare.

The growth-regulating action was determined two weeks after the treatment by measuring the length of the stalk sections (internodes). The measured results were set in relation to those in untreated control plants and calculated as percentual growth retardation.

| Compound according to the invention | Active substance kg/ha | Growth retardation in % | |
|---|---|---|---|
| | | Bush bean | Peanut |
| 5-(N-phenylcarbamoyl-amino)-1,2,3-thiadiazole | 0.3 | 76 | 53 |
| | 1 | 80 | 62 |
| | 3 | 85 | 62 |
| Untreated | | 0 | 0 |

EXAMPLE 3

Potted oat (*Avena sativa*) in the two-leaf stage was treated in a greenhouse test with quantities of 1 and 3 kg/ha of the compound of the invention shown in the table below. The active substance was applied as a 20% spray powder in aqueous suspension at a rate of 500 liters of liquid spray per hectare.

The growth-regulating effect was determined two weeks after the treatment by counting the stem-forming shoots formed in that time on 100 plants.

EXAMPLE 4

In a greenhouse test, the plant species listed in the table below were -(N,N-dimethylcarbamoylamino)- before emergence with quantities of 0.3 kg, 1 kg and 3 kg/ha of the named compound according to the invention. The active substance was applied as a 20% spray powder in aqueous suspension at a rate of 500 liters of liquid spray per hectare.

Three weeks after the treatment, the dose-dependent growth retardation was determined by measuring the length of the stalk sections (internodes).

| Compound according to the invention | Active substance kg/ha | Growth retardation in % | | |
|---|---|---|---|---|
| | | Bush bean | Soy 09bean | Peanut |
| 5-(N-phenylcarbamoyl-amino)-1,2,3-thiadiazole | 0.3 | 70 | 53 | 3 |
| | 1 | 86 | 76 | 60 |
| | 3 | 92 | 79 | 71 |
| Untreated | | 0 | 0 | 0 |

EXAMPLE 5

For the preparation of another greenhouse test, a dense, lawn type stand of lolium perenne (German "Weidelgras") in clay bowls was cut short and then treated with quantities of 1 and 3 kg/ha of the compounds listed in the table below as aqueous suspensions at 500 liters of liquid spray per hectare.

Four weeks after the treatment, the height of growth of the grasses was measured and the plant damage caused by the agents used was rated. Results achieved thereby underscore a growth inhibition by the compound according to the invention as being clearly superior to the reference agent.

EXAMPLE 6

In greenhouse tests, 5-(N-phenylcarbamoylamino)-1,2,3-thiadiazole as the compound according to the invention was applied in a quantity of 3 kg active substance in 500 liters of aqueous suspension per hectare before and after emergence of the following weed species:

*Setaria faberi, Digitaria sanguinalis, Setaria italica, Echinochloa crus galli, Lolium perenne, Sorghum halepense, Cyperus esculentus, Cynodon dactylon, Agropyron repens, Alopecurus sp., Avena sp., chrysanthemum sp., Galium sp., Centauera sp., Lamium sp. and Senecio sp.*

| Compound according to the invention | Active substance kg/ha | Average height of growth of the grasses in cm | Damage (Burning) |
|---|---|---|---|
| 5-(N-phenylcarbamoyl-amino)-1,2,3-thiadiazole | 1 | 5 | medium |
| | 3 | 2 | very severe |
| Reference agent Maleic acid hydrazide | 1 | 10 | none |
| | 3 | 8 | medium |
| Untreated | | 14 | |

We claim:
1. Compounds of the formula:

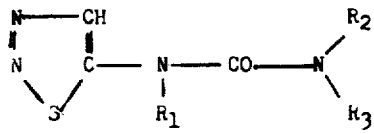

wherein $R_1$ is hydrogen, methyl or ethyl; $R_2$ is hydrogen or alkyl having from 1 to 4 carbon atoms; $R_3$ is selected from the group consisting of alkyl, having from 1 to 4 carbon atoms, cyclopentyl, cyclohexyl, methylcyclohexyl, phenyl or substituted phenyl having one or more substituents from the group consisting of chlorine, methyl, methoxy, trifluomethyl, and nitro and when taken together with the amino-nitrogen, $R_2$ and $R_3$ can be morpholino, piperidino, or pyrrolidino.

2. A compound as set forth in claim 1 which is 5-(N-phenylcarbamoylamino)-1,2,3-thiadiazole.

3. A compound as set forth in claim 1 which is 5-(N-4-chlorophenylcarbamoylamino)-1,2,3-thiadiazole 4. A compound as set forth in claim 1, which is 5-(N-cyclohexylcarbamoylamino)-1,2,3-thiadiazole.

5. A compound as set forth in claim 1 which is 5-(N-3-chlorophenylcarbamoylamino)-1,2,3-thiadiazole.

6. A compound as set forth in claim 1 which is 5-(N-4-methylphenylcarbamoylamino)-1,2,3-thiadiazole.

7. A compound as set forth in claim 1 which is 5-(N-3-methylphenylcarbamoylamino)-1,2,3-thiadiazole.

8. A compound as set forth in claim 1 which is 5-(N-3,4-dichlorophenylcarbamoylamino)-1,2,3-thiadiazole.

9. A compound as set forth in claim 1 which is 5-(N-methylcarbamoylamino)-1,2,3-thiadiazole.

10. A compound as set forth in claim 1 which is 5-(N,N-dimethylcarbamoylamino)1 1,2,3-thiadiazole.

* * * * *